United States Patent [19]

Trotman et al.

[11] Patent Number: 4,676,357
[45] Date of Patent: Jun. 30, 1987

[54] DIAPHRAGM SPRING CLUTCH COVER ASSEMBLY

[75] Inventors: Steven Trotman, Stratford-on-Avon; Ian C. Maycock, Leamington Spa, both of England

[73] Assignee: Automotive Products plc, Leamington Spa, England

[21] Appl. No.: 830,107

[22] Filed: Feb. 10, 1986

[30] Foreign Application Priority Data

Feb. 11, 1985 [GB] United Kingdom ............... 8503407

[51] Int. Cl.$^4$ ............................................. F16D 13/44
[52] U.S. Cl. .................................. 192/89 B; 192/70.27
[58] Field of Search ........................... 192/89 B, 70.27

[56] References Cited

U.S. PATENT DOCUMENTS 3,323,624 6/1976 Maurice ........................... 192/89 B
4,184,578 1/1980 Moore et al. ..................... 192/89 B

FOREIGN PATENT DOCUMENTS 2459921 2/1981 France ............................. 192/89 B Primary Examiner—Carl D. Friedman
Attorney, Agent, or Firm—Solon B. Kemon

[57] ABSTRACT

A diaphragm spring clutch cover assembly having a cover to be secured to a driven plate or flywheel and a pressure plate attached to the cover and urged by a diaphragm spring to press a driven plate against the driving plate in an assembled clutch. The diaphragm spring acts between a first fulcrum arrangement on the pressure plate and a second fulcrum arrangement on the cover. The first fulcrum arrangement comprises arcuate spaced lands in a circle on the pressure plate, a resilient wire ring engaged by the lands and spanning the spaces between the lands, and sleeves on the ring at those spaces. The sleeves are pressed axially of the clutch by the diaphragm spring so that during clutch reengagement the axial deformation of the spanning portions of the ring creates cushioning.

18 Claims, 20 Drawing Figures

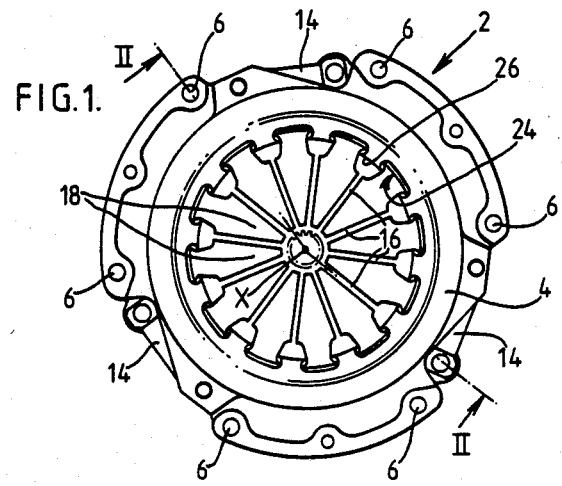
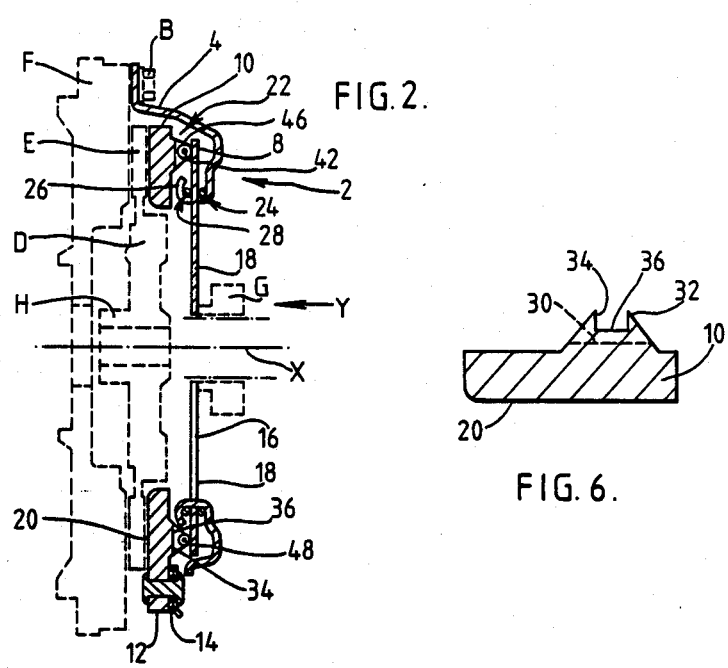

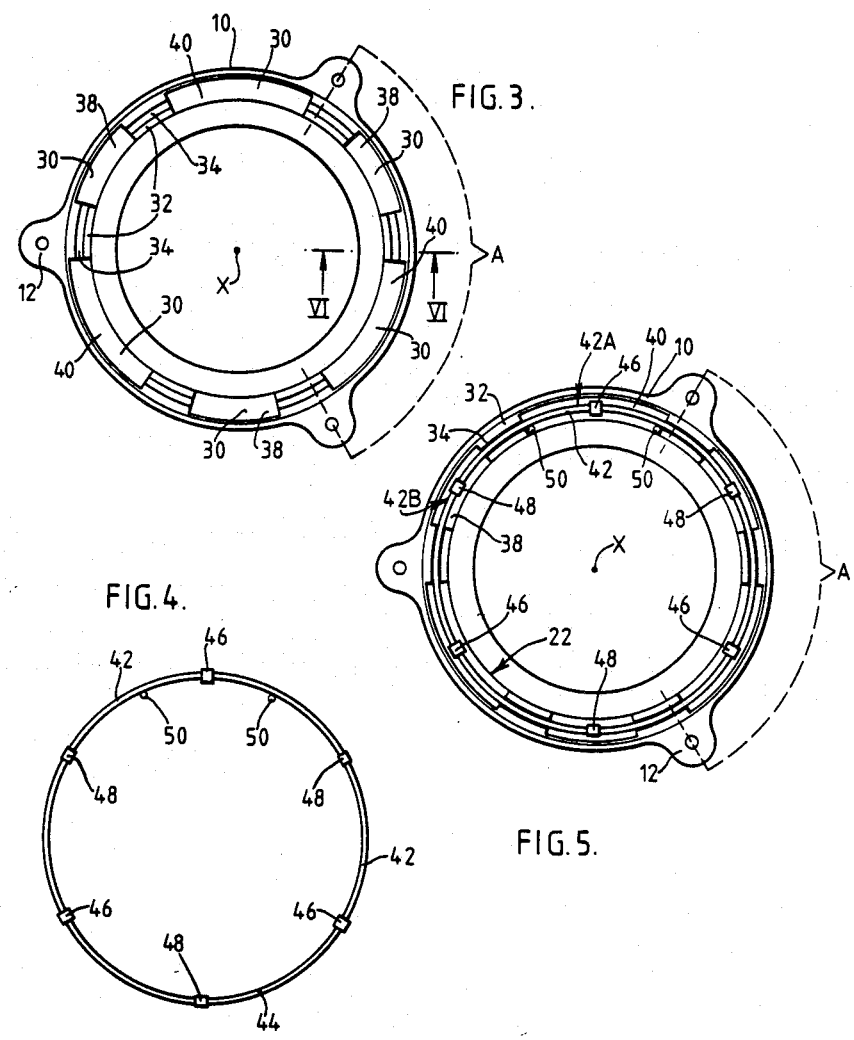

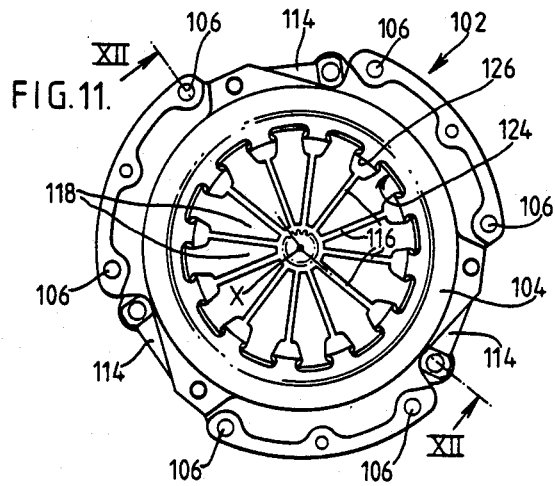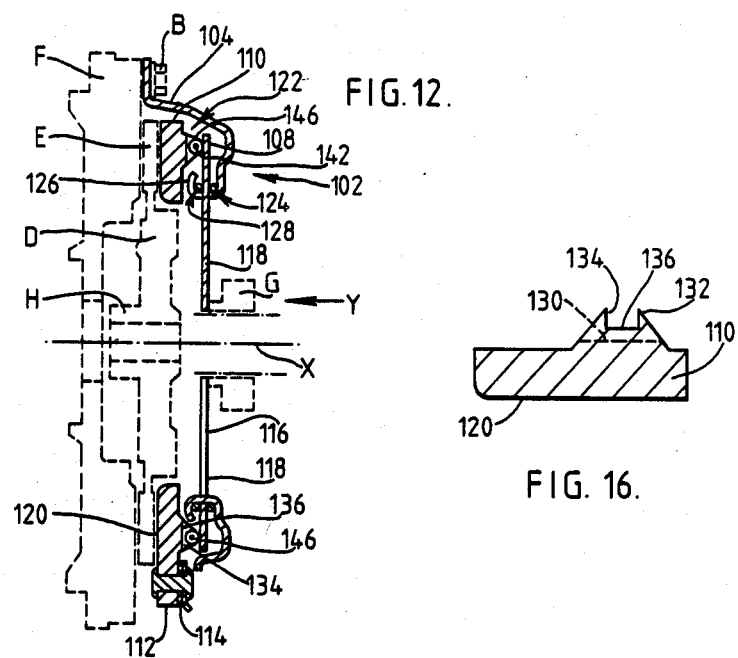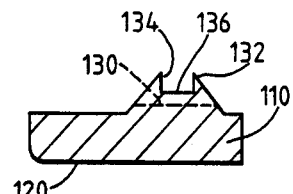

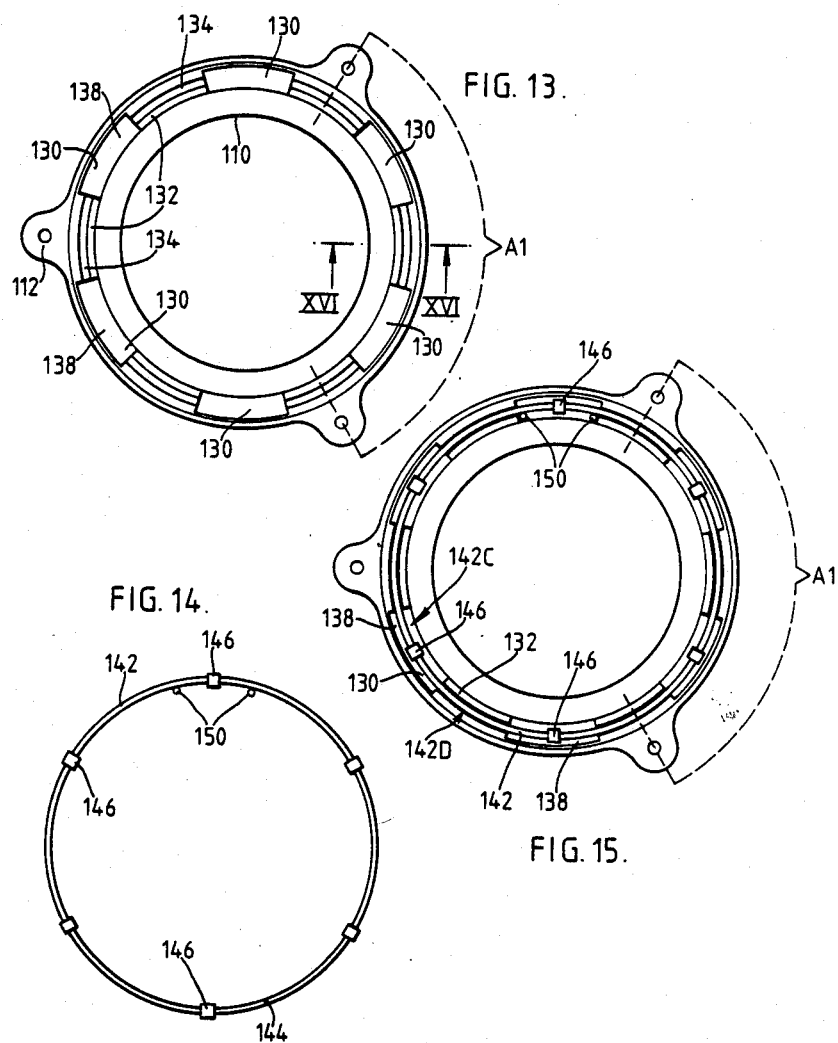

DIAPHRAGM SPRING CLUTCH COVER ASSEMBLY

This invention concerns a diaphragm spring clutch cover assembly of the type (hereinafter called "the type referred to") comprising a pressure plate, a cover, a diaphragm spring having a plurality of radially inwardly directed fingers, and said diaphragm spring acting between a first annular fulcrum arrangement on the pressure plate and a second annular fulcrum arrangement on the cover.

In use the assembly is secured to a driving member, for example a fly-wheel of a motor vehicle engine, so that a driven plate is clamped between the pressure plate and the driving member by the load of the diaphragm spring, the driven plate being released by an axial effort applied through a release bearing to radially inner ends of the fingers of the diaphragm spring.

In well known clutches comprising cover assemblies of the type referred to, the driven plate is cushioned in that it comprises a carrier plate having friction facings mounted on cushioning between the facings. But to simplify and cheapen production of driven plates and to reduce inertia thereof, driven plates with reduced or no cushioning between the friction facings have been proposed. To compensate for this lack of cushioning it has been proposed to incorporate means which provide a degree of axial flexibility or cushioning into one of the annular fulcra in a diaphragm spring clutch assembly of the type referred to. One way of providing cushioning means in the clutch cover assembly which is simple to manufacture and install and yet provides a subjectively acceptable clutch engagement when mounted in a motor vehicle is disclosed in G.B. No. 1583403. That patent describes a diaphragm spring clutch cover assembly of the type referred to futher comprising cushioning means in one of the annular fulcra arrangements, the cushioning means being formed by a single wavy ring having undulations which extend parallel to the axis of the diaphragm spring, and the undulations being constituted by a first series and by a second series of said undulations wherein the undulations of the first series have a lower stiffness but greater axial amplitude and wavelength than the undulations of the second series. During re-engagement of the driven plate (after a disengagement) the initial cushioning is by the first series and then by both series, which ensures that the clamp load increases progressively over a substantial range of movement of the release bearing during clutch re-engagement.

It has been found that manufacturing a wavy ring having undulations of differing stiffnesses and sizes can be difficult in mass production.

An object of this invention is to provide a diaphragm spring clutch cover assembly of the type referred to capable of being constructed, as will be understood from the ensuing description with reference to the drawings, in which the aforesaid difficulty can be avoided and at the same time that assembly can be used to form a clutch for a mototr vehicle in which clutch re-engagement is subjectively acceptable and the clamp load increases progressively during re-engagement.

Acording to a first aspect of the invention there is provided a diaphragm spring clutch cover assembly comprising a pressure plate, a cover, a diaphragm spring for loading the pressure plate, a first annular fulcrum arrangement to one side of the diaphragm spring and provided on the pressure plate, a second annular fulcrum arrangement to the oppposite side of said diaphragm spring and provided on the cover, and the diaphragm spring acting between the fulcrum arrangements, characterised in that at least one of the fulcrum arrangements comprises cushioning means comprising a resilient fulcrum ring, an annular array of spaced supporting means supporting the ring about the axis of the diaphragm spring, portions of the ring each spanning a respective space between adjacent said supporting means, and the arrangement being such that said portions of the ring are urged at spaced locations around the ring by the diaphragm spring so as to resiliently deform the portions axially of the ring in their respective spaces during movement relative to the cover of the diaphragm spring for the latter to apply increasing loading on the pressure plate.

Aforesaid portions of the fulcrum ring can comprise projecting parts facing towards the diaphragm spring so that the diaphragm spring can contact the projecting parts.

The fulcrum ring may comprise a first series of first said portions and a second series of second said portions, and each of said first portions being less resistant to said axial deformation than any of said second portions. Preferably said portions of the fulcrum ring comprise projecting parts facing towards the diaphragm and so arranged that the projecting parts at the second portions are contacted by the diaphragm spring to urge the second portions axially during said relative movement after the first portions are urged axially by contact of the projecting parts at the first portion by the diaphragm spring. The projecting part at a said portion of the fulcrum ring may be an enlargement on said portion, and said enlargement having in the circumferential direction of the ring a length less than the space spanned by that portion. One of the projecting parts can be a sleeve on the fulcrum ring. At least two of the projecting parts can be sleeves, one of the sleeves having a greater external diameter than the other sleeve.

According to a second aspect of the invention a clutch cover assembly formed according to the first aspect is futher characterised in that during movement relative to the cover of the diaphragm spring for the latter to apply increasing loading on the pressure plate, aforesaid spanning portions of the fulcrum ring are resiliently deformed axially of the ring in a first direction in their respective spaces and intermediate said spanning portions other portions of the ring bow substantially axially in the second direction towards the diaphragm spring which during continued said movement of the spring compresses said bows.

In an ebodiment of the second aspect each said other portion may be opposite a said supporting means. Said spanning portions of the fulcrum ring may comprise aforesaid projecting parts facing towards the diaphragm spring, and along the direction from the fulcrum ring towards the diaphragm spring all said projecting parts may have substantially the same dimension.

The invention will now be futher described, by way of example, with reference to the accompanying drawings in which:

FIG. 1 is a plan view of an embodiment of a diaphragm spring friction clutch cover assembly formed according to the invention;

FIG. 2 is a section on an enlarged scale on line II—II of FIG. 1, the cover assembly being shown in combination with other parts, represented in dotted lines, to form a clutch;

FIG. 3 is a plan view, on an enlarged scale, of the pressure plate used in FIG. 1;

FIG. 4 is a plan view, on an enlarged scale, of the fulcrum ring used in FIG. 1;

FIG. 5 shows the pressure plate and ring of FIGS. 3 and 4 in combination;

FIG. 6 is a section, on enlarged scale, on line VI—VI of FIG. 3;

FIG. 11 is a plan view of another embodiment of a diaphragm spring friction clutch cover assembly formed according to the invention;

FIG. 12 is a section on an enlarged scale on line XII—XII of FIG. 11, the cover assembly being shown in combination with other parts, represented in dotted lines, to form a clutch;

FIG. 13 is a plan view, on an enlarged scale, of the pressure plate used in FIG. 11;

FIG. 14 is a plan view, on an enlarged scale, of the fulcrum ring used in FIG. 11;

FIG. 15 shows the pressure plate and ring of FIGS. 13 and 14 in combination;

FIG. 16 is a section, on enlarged scale, on line XVI—XVI of FIG. 13;

Figure 7:
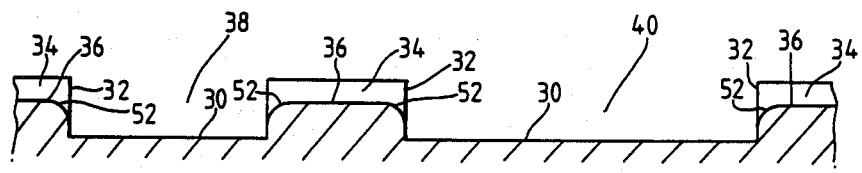
FIG. 7 is a diagrammatic and fragmentary view on an enlarged scale of a development of the segment A of the pressure plate in FIG. 3.

With reference to FIGS. 1 to 8 of the drawings a clutch cover assembly 2 suitable for use in a motor vehicle clutch comprises a cover 4 apertured at 6 for bolts B to secure the cover assembly to a rotatably driven driving pate F, for example a flywheel of a motor vehicle engine. The cover assembly further comprises an annular diaphragm spring 8 centred on axis X and an annular pressure plate 10 which rotates with the cover about the axis X due to the cover and lugs 12 on the pressure plate being interconnected in known manner by tangential, spring driving straps 14. The diaphragm spring is radially slotted at 16 to form a plurality of radially inwardly extending fingers 18.

When the cover assembly 2 is in use a clutch, face 20 of the presure plate 10 faces towards a clutch driven plate D known per se having friction facings E, which may be mounted on the driven plate in a substantially non-cushioned manner, if desired. The driven plate D has a central hub H axially slidably engaging in known manner axial splines on an output shaft (not shown) to be rotatably driven about the axis X by the driven plate. On the side of the pressure plate remote from the pressure face 20 is an annular fulcrum arrangement 22 (to be described in more detail herebelow) centred on axis X. On the opposite side of the diaphargem spring 8 is another fulcrum arrangement 24 concentric with the fulcrum 22 but of lesser diameter and formed by a wire ring held by the cover 4 against the diaphragm spring. The cover 4 has hooked tabs 26 each disposed in a respective hole at an end of each slot 16, the tabs collectively serving to retain the fulcrum arrangement 24 and a futher annular fulcrum arrangement 28 formed by a wire ring on the pressure plate side of the diaphragm spring. When the clutch comprising the cover assembly is in use the driven plate D is released by axial movement in direction Y of a clutch release bearing G known per se pushing the radially inner ends of the fingers 18 to relieve the clamp load (derived from the diaphragm spring 8) exerted on the driven plate by the driving plate F and pressure plate 10. The biasing load of the driving straps 14 ensures in known manner that the pressure plate 10 moves in the opposite direction to Y by an amount which frees the driven plate for clutch release.

Fulcrum arrangement 22 comprises an annular plateau 30 from which project at spaced intervals ridge shaped similar lands 32 each having in its apex an arcuate slot 34 which is substantially centred on axis X and is open at both ends. Bases 36 of the slots 34 all lie in substantially the same plane which is at substantially 90° to the axis X and is substantially parallel to the plane plateau 30 which forms the bases of spaces 38 and 40 between the lands 32. Spaces 38 are substantially similar and are substantially equi-angularly spaced about axis X. Spaces 40 are also substantially similar and substantially equi-angularly spaced about axis X. The spaces 40 are longer than spaces 38. For example, each space 40 may have with respect to the axis X an angular length of substantially 53°, each space 38 may have an angular length of substantially 29°, and the lands 32 may have an angular length of substantially 19°. Resting against the bases 36 of the grooves 34 is a resilient fulcrum ring 42 of any suitable material for example steel wire. The cross-section of the material forming the ring 42 may be any desired shape, for example circular. Opposite ends of the ring material can be attached together at 44, for example by welding, or the ring can be open. In an unstressed state the ring 42 can be planar. Relatively short sleeves 46 and 48 of external cylindrical shape fit snugly on the ring 42 and are affixed thereto at spaced intervals. These intervals may be substantially equal and in the drawings are about 60°. The sleeves 46 are substantially similar as are the sleeves 48, but the sleeves 46 have the greater external diameter. Locating pips 50 on the fulcrum ring 42, serve, in conjunction with end faces of two adjacent lands 32 at either end of a space 40, to hold the fulcrum ring so that each larger diameter sleeve 46 is over substantially the middle of the respective long space 40 and each smaller diameter sleeve 48 is substantially over the middle of the respective short space 38. In the drawings the material forming the fulcrum ring 42 is of substantially constant thickness. Therefore each ring portion 42A bearing a said larger diameter sleeve 46 and spanning a respective long space 40 is less stiff and therefore more easily deformable axially of the fulcrum ring than any ring portion 42B bearing a said smaller diameter sleeve 48 and spanning a said shorter space 38. At the ends of the grooves 34 each groove base 36 is radiused at 52 into each space 38 or 40.

Figure 8:
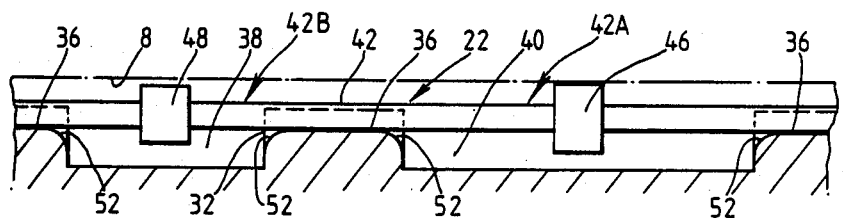
FIG. 8 is a view similar to FIG. 7 of the segment A of the combination in FIG. 5.

Referring particularly to FIG. 8, which corresponds (when the cover assembly is used in a clutch) to the clutch being fully released, the larger diameter sleeves 46 are in contact with the diaphragm spring 8 and the smaller diameter sleeves 48 are spaced from the spring.

Figure 9:
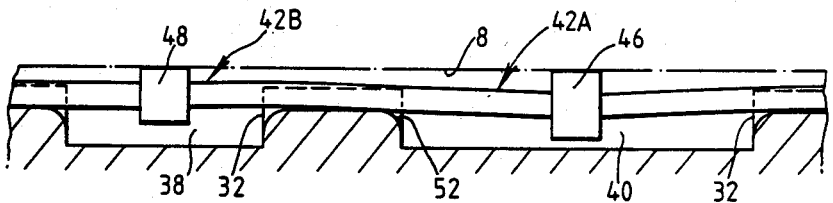
FIG. 9 is a view similar to FIG. 8 of a stage in the axial deformation of the fulcrum ring.
Figure 10:
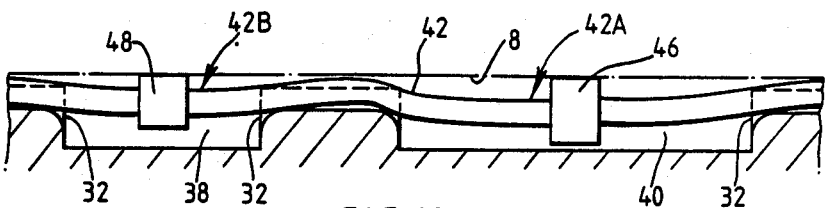
FIG. 10 shows a futher stage in axial deformation of the fulcrum ring in the clutch cover assembly of FIG. 1.
Figure 17:
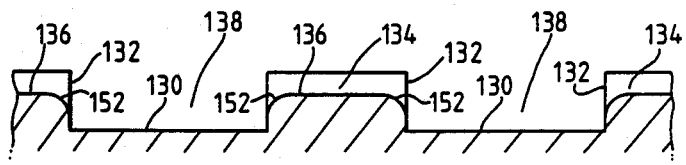
FIG. 17 is a diagrammatic and fragmentary view on an enlarged scale of a development of the segment A1 of the pressure plate in FIG. 13.

During clutch re-engagement the release bearing G (FIG. 3) is allowed to move in the opposite direction to Y as the diaphragm spring 8 moves relatively to the cover to apply clamping load to the driven plate. This movement of the diaphragm spring is initially cushioned by first presssing on the sleeves 46 to deform the less stiff ring portion 42A axially into the spaces 40 until the stage represented by FIG. 9 is reached. Then the diaphragm spring 8 pushes the smaller diameter sleeves 48 and further but more stiff cushioning occurs due to axial deformation into the spaces 38 of the initially more stiff ring portions 42B and further deformation into the spaces 40 of the ring portions 42A until there is maximum deformation of the ring portions as represented by FIG. 10.

The provision of what may be regarded as two stage cushioning by using a resilient ring with sleeves of two different outer diameters can give a smooth engagement characteristic to the clutch so, as indicated above, the clutch cover assembly 2 may be used in conjunction with a driven plate having non-cushioned friction facings and give a subjectively acceptable clutch engagement.

As an alternative or in addition, the fulcrum arrangement 24 (FIG. 3) may be substituted by one comparable to 22 in which the cover 4 is formed with grooved lands supporting a resilient ring with sleeves comparable with that in FIG. 4.

With reference to FIGS. 11 to 18 of the drawings a clutch cover assembly 102 suitable for use in a motor vehicle clutch comprises a cover 104 apertured at 106 for bolts B to secure the cover assembly to a rotatably driven driving plate F, for example a fly-wheel of a motor vehicle engine.

The cover assembly futher comprises an annular diaphragm spring 108 centred on axis X and an annular pressure plate 110 which rotates with the cover about the axis X due to the cover and lugs 112 on the pressure plate being interconnected in known manner by tangential, spring driving straps 114. The diaphragm spring is radially slotted at 116 to form a plurality of radially inwardly extending fingers 118. When the cover assembly 102 is in use in a clutch, face 120 of the pressure plate 110 faces towards a clutch driven plate D known per se having friction facings E, which may be mounted on the driven plate in a sub-stantially non-cushioned manner, if desired. The driven plate D has a central hub H axially slidably engaging in known manner axial splines on an output shaft (not shown) to be rotatably driven about the axis X by the driven plate.

On the side of the pressure plate remote from the pressure face 120 is an annular fulcrum arrangement 122 (to be described in more detail herebelow) centred on axis X. On the opposite side of the diaphragm spring 108 is another fulcrum arrangement 124 concentric with the fulcrum 122 but of lesser diameter and formed by a wire ring held by the cover 104 against the diaphragm spring. The cover has hooked tabs 126 each disposed in a respective hole at an end of each slot 116, the tabs collectively serving to retain the fulcrum arrangement 124 and a further annular fulcrum arrangement 128 formed by a wire ring on the pressure plate side of the diaphragm spring.

When the clutch comprising the cover assembly is in use the driven plate D is released by axial movement in direction Y of a clutch release bearing G known per se pushing the radially inner ends of the fingers 118 to relieve the clamp load (derived from the diaphragm spring 108) exerted on the driven plate by the driving plate F and pressure plate 110. The biasing load of the driving straps 114 ensures in known manner that the pressure plate 110 moves in the opposite direction to Y by an amount which frees the driven plate for clutch release.

Fulcrum arrangement 122 comprises an annular plateau 130 from which project at spaced intervals ridge shaped similar lands 132 each having in its apex an arcuate slot 134 which is substantially centred on axis X and is open at both ends. Bases 136 of the slots 134 all lie in substantially the same plane which is at substantially 90° to the axis X and is substantially parallel to the plane of the plateau 130 which forms the bases of spaces 138 between the lands 132. Spaces 138 are substantially similar and are substantially equi-angularly spaced about axis X.

Resting against the bases 136 of the slots 34 is a resilient fulcrum ring 142 of any suitable material for example steel wire. The cross-section of the material forming the ring 142 may be any desired shape, for example circular. Opposite ends of the ring material can be attached together at 144, for example by welding or the ring can be open. In an unstressed state the ring 142 can be planar. Relatively short sleeves 146 of external cylindrical shape fit snugly on the ring 142 and are affixed thereto at spaced intervals. These intervals may be substantially equal and in the drawings are about 60°. The sleeves 146 are substantially similar, having substantially the same external diameter. Locating pips 150 on the fulcrum ring 142 serve, in conjunction with end faces of two adjacent lands 132 at either end of a space 138, to hold the fulcrum ring so that each sleeve 146 is over substantially the middle of a respective space 138. In the drawing the material forming the fulcrum ring 142 is of substantially constant thickness. Therefore a ring portion 142C bearing a respective sleeve 146 and spanning a respective space 138 has substantially the same stiffness and has substantially the same resistance to deformation axially of the fulcrum ring as any other ring portion 142C. At the ends of the grooves 134 each groove base 136 is radiused at 152 into each space 138.

Figure 18:
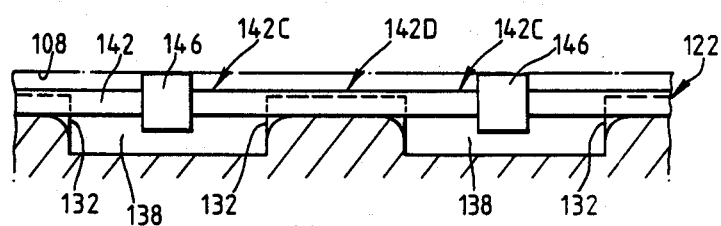
FIG. 18 is a view similar to FIG. 17 of the segment A1 of the combination in FIG. 15.

Referring particularly to FIG. 18, which corresponds (when the cover assembly is used in a clutch) to the clutch being fully released, the sleeves 146 are in contact with the diaphragm spring 108.

Figure 19:
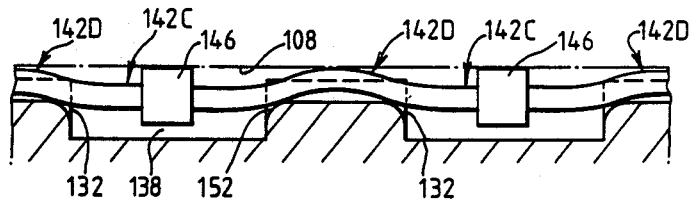
FIG. 19 is a view, similar to FIG. 18, diagrammatically illustrating a stage in the axial deformation of the fulcrum ring, and FIG. 20 diagrammatically illustrates a further stage in axial deformation of the fulcrum ring in the clutch cover assembly of FIG. 11.
Figure 20:
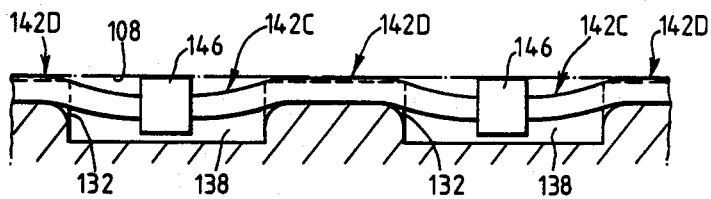

During clutch re-engagement the release bearing G (FIG. 13) is allowed to move in the opposite direction to Y and the diaphragm spring 108 moves relatively to the cover to apply clamping load to the driven plate. This movement of the diaphragm spring is initially cushioned by its first pressing on the sleeves 146 to deform or bow the ring portions 142C axially into the spaces 138. As this occurs portions 142D of the fulcrum ring 142 deform or bow axially in the opposite direction at the lands 132 until the stage represented by FIG. 19 is reached. Then the diaphragm spring 108 presses on the bows 142D as well as on the sleeves 146 and more stiff cushioning occurs due to the axial compression of the bows 142D towards the lands 132 the further axial pushing of the sleeve 146 into the spaces 138, as represented in FIG. 20. During the aforesaid axial deformations of the fulcrum ring 142 there may be some variation in radial dimensions or positions of parts of the ring due to the deformations.

The provision of what may be regarded as two stage cushioning by firstly deforming the portions 142C and then secondly by compressing the resultant bows 142D and continuing to deform the portions 142C can give a smooth engagement characteristic to the clutch so, as indicated above, the clutch cover assembly 102 may be used in conjunction with a driven plate having non-cushioned friction facings and give a subjectively acceptable clutch engagement.

The cushioning characteristics may be varied by using fulcrum rings of different materials and/or different axial thicknesses and/or different cross-sectional shapes and/or by changing the circumferential length of one or more of the spaces 138 and/or one or more of the lands 132. For example the longer a space 138 is the less stiff (and therefore more easily deformable) is the ring portion 142C spanning the space. Also the longer a land 132 is the less stiff is a bow 142D (FIG. 9) and thus relatively more easy to compress towards the land.

As an alternative or in addition, the fulcrum arrangement 124 (FIG. 12) may be substituted by one comparable to 122 in which the cover 104 is formed with grooved lands supporting a resilient ring with sleeves comparable with that in FIG. 4.

The invention as described above with reference to FIGS. 1 to 10 or FIGS. 11 to 20 may also be applied to a diaphragm spring pull-type clutch which can have on the pressure plate and/or on the cover an annular fulcrum for the diaphragm spring, that fulcrum being formed by a fulcrum arrangement comprising an annular array of spaced, grooved lands supporting a resilient fulcrum ring provided with spaced sleeves.

We claim:

1. A diaghragm spring clutch cover assembly comprising a pressure plate mounted on a cover, a diaphragm spring mounted on said cover to load said pressure plate, a first annular fulcrum arrangement to one side of said diaphragm spring and provided on said pressure plate, a second annular fulcrum arrangement to the opposite side of said diaphragm spring and provided on said cover, said diaphragm spring acting between said fulcrum arrangements, at least one of said fulcrum arrangements comprising cushioning means, said cushioning means comprising a resilient fulcrum ring, an annular array of spaced supporting means supporting the ring about the axis of the diaphragm spring, portions of the ring each spanning a respective space which is disposed between adjacent said supporting means, and said portions of said ring being urged at spaced locations around said ring by said diaphragm spring whereby axially of said ring portions of said ring are resiliently deformed in said spaces during movement relative to the cover of the diaphragm spring as the latter applies increasing load on said pressure plate.

2. A clutch cover assembly according to claim 1, wherein aforesaid portions of said fulcrum ring comprise projecting parts facing towards said diaphragm spring to be contracted by said diaphragm spring.

3. A clutch cover assembly according to claim 2, wherein at least one said projecting part is a sleeve on the fulcrum ring.

4. A clutch cover assembly according to claim 3, wherein at least two of said projecting parts are sleeves on the fulcrum ring, and one said sleeve has a greater external diameter than the other sleeve.

5. A clutch cover assembly according to claim 1, wherein said fulcrum ring comprises a first and second series of said portions and each of said second series of portions being more resistant to axial deformation than any of said first series of portions.

6. A clutch cover assembly according to claim 5, wherein said first and second portions alternate.

7. A clutch cover assembly according to claim 5, wherein said portions of the fulcrum ring comprise projecting parts facing towards the diaphragm spring, said projecting parts at the second portions being contacted by the diaphragm spring to urge said second portions axially during said relative movement after said first portions are urged axially by contact of said projecting parts at said first portions by said diaphragm spring.

8. A clutch cover assembly according to claim 7, wherein the projecting part at a said portion of the fulcrum ring is an enlargement on said portion, and said enlargement has in the circumferential direction of said ring a length less than said space spanned by that portion.

9. A clutch cover assembly according to claim 8, wherein each enlargement is a sleeve on said fulcrum ring, and each said sleeve at a said first portion has a greater external diameter than any said sleeve at a said second portion.

10. A clutch cover assembly according to claim 5 wherein said space spanned by each said first portion of said fulcrum ring is greater than that spanned by said second portion of said ring whereby each said first portion is longer than any said second portion.

11. A clutch cover assembly according to claim 1, wherein each said supporting means comprises a land engaging a segment of said fulcrum ring between two adjacent said portions of said ring.

12. A clutch cover assembly according to claim 1, wherein during movement relative to the cover of said diaphragm spring to apply increasing load on said pressure plate, first portions of said fulcrum ring are resiliently deformed axially of said ring in a first direction in their respective spaces and intermediate said first portions, second portions of the ring bow substantially axially in a second direction towards said diaphragm spring which during continued movement of said spring compresses said bows.

13. A clutch cover assembly according to claim 12, wherein each said second portion is opposite a reapective said supporting means.

14. A clutch cover assembly according to claim 12, wherein said first portions of said fulcrum ring comprise projecting parts facing towards said diaphragm spring.

15. A clutch cover assembly according to claim 14, wherein all said projecting parts have substantially the same dimensions along the direction from the fulcrum ring towards the diaphragm spring.

16. A clutch cover assembly according to claim 14, wherein the projecting part at a said first portion of said fulcrum ring is an enlargement on said first portion, and said enlargement has in the circumferential direction of said ring a length less than said space spanned by that said first portion.

17. A clutch cover assembly according to claim 16, wherein each said enlargement is a sleeve on said fulcrum ring, and said sleeves each have substantially the same external diameter.

18. A clutch cover assembly according to claim 12, wherein each supporting means comprises a land engaging a said second portion of said fulcrum ring between two adjacent said first portions of said ring.

* * * * *